(12) United States Patent
Sharifi et al.

(10) Patent No.: US 11,972,766 B2
(45) Date of Patent: Apr. 30, 2024

(54) DETECTING AND SUPPRESSING COMMANDS IN MEDIA THAT MAY TRIGGER ANOTHER AUTOMATED ASSISTANT

(71) Applicant: GOOGLE LLC, Mountain View, CA (US)

(72) Inventors: Matthew Sharifi, Kilchberg (CH); Victor Carbune, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/100,424

(22) Filed: Jan. 23, 2023

(65) Prior Publication Data

US 2023/0162740 A1 May 25, 2023

Related U.S. Application Data

(63) Continuation of application No. 17/108,705, filed on Dec. 1, 2020, now Pat. No. 11,562,748.

(51) Int. Cl.
*G10L 17/22* (2013.01)
*G06F 3/16* (2006.01)
(Continued)

(52) U.S. Cl.
CPC .............. *G10L 17/22* (2013.01); *G06F 3/165* (2013.01); *G10L 19/018* (2013.01); *G10L 25/51* (2013.01)

(58) Field of Classification Search
CPC ....... G10L 17/22; G10L 19/018; G10L 25/51; G10L 2015/088; G10L 15/00; G10L 15/08; G10L 15/22; G10L 15/20; G10L 15/1822; G10L 15/1815; G06F 3/165; G06F 3/167; G06F 3/16; G06F 3/0481; G06F 3/011;
(Continued)

(56) References Cited

U.S. PATENT DOCUMENTS

2017/0242653 A1* 8/2017 Lang ................... H04L 12/2809
2019/0043492 A1* 2/2019 Lang ................ H04N 21/42203
(Continued)

OTHER PUBLICATIONS

European Patent Office; International Search Report and Written Opinion issued in Application No. PCT/US2021/061258; 11 pages; dated Mar. 30, 2022.

*Primary Examiner* — Leshui Zhang
(74) *Attorney, Agent, or Firm* — Gray Ice Higdon

(57) ABSTRACT

Techniques are described herein for detecting and suppressing commands in media that may trigger another automated assistant. A method includes: determining, for each of a plurality of automated assistant devices in an environment that are each executing at least one automated assistant, an active capability of the automated assistant device; initiating playback of digital media by an automated assistant; in response to initiating playback, processing the digital media to identify an audio segment in the digital media that, upon playback, is expected to trigger activation of at least one automated assistant executing on at least one of the plurality of automated assistant devices in the environment, based on the active capability of the at least one of the plurality of automated assistant devices; and in response to identifying the audio segment in the digital media, modifying the digital media to suppress the activation of the at least one automated assistant.

20 Claims, 6 Drawing Sheets

(51) Int. Cl.
*G10L 19/018* (2013.01)
*G10L 25/51* (2013.01)

(58) Field of Classification Search
CPC ............... G06F 3/017; G06F 16/90332; G06F 16/3334; G06F 16/433; G06F 16/48; G06F 16/00; G06F 9/451; G06F 40/295; H04L 67/12
USPC ....... 704/246, 247, 249, 250, 232, 233, 237, 704/239
See application file for complete search history.

(56) References Cited

U.S. PATENT DOCUMENTS

| | | | | |
|---|---|---|---|---|
| 2019/0362719 A1* | 11/2019 | Gruenstein | ............. | G10L 17/00 |
| 2020/0075010 A1* | 3/2020 | Lang | ........................ | G06F 3/167 |
| 2020/0090646 A1* | 3/2020 | Smith | ..................... | G10L 15/08 |
| 2021/0366477 A1* | 11/2021 | Smith | ..................... | G10L 15/30 |
| 2022/0172727 A1 | 6/2022 | Sharifi et al. | | |

\* cited by examiner

DETECTING AND SUPPRESSING COMMANDS IN MEDIA THAT MAY TRIGGER ANOTHER AUTOMATED ASSISTANT

BACKGROUND

Humans can engage in human-to-computer dialogs with interactive software applications referred to herein as "automated assistants" (also referred to as "digital agents", "interactive personal assistants", "intelligent personal assistants", "assistant applications", "conversational agents", etc.). For example, humans (which when they interact with automated assistants may be referred to as "users") may provide commands and/or requests to an automated assistant using spoken natural language input (i.e., utterances), which may in some cases be converted into text and then processed, by providing textual (e.g., typed) natural language input, and/or through touch and/or utterance free physical movement(s) (e.g., hand gesture(s), eye gaze, facial movement, etc.). An automated assistant responds to a request by providing responsive user interface output (e.g., audible and/or visual user interface output), controlling one or more smart devices, and/or controlling one or more function(s) of a device implementing the automated assistant (e.g., controlling other application(s) of the device).

As mentioned above, many automated assistants are configured to be interacted with via spoken utterances. To preserve user privacy and/or to conserve resources, automated assistants refrain from performing one or more automated assistant functions based on all spoken utterances that are present in audio data detected via microphone(s) of a client device that implements (at least in part) the automated assistant. Rather, certain processing based on spoken utterances occurs only in response to determining certain condition(s) are present.

For example, many client devices, that include and/or interface with an automated assistant, include a hotword detection model. When microphone(s) of such a client device are not deactivated, the client device can continuously process audio data detected via the microphone(s), using the hotword detection model, to generate predicted output that indicates whether one or more hotwords (inclusive of multi-word phrases) are present, such as "Hey Assistant", "OK Assistant", and/or "Assistant". When the predicted output indicates that a hotword is present, any audio data that follows within a threshold amount of time (and optionally that is determined to include voice activity) can be processed by one or more on-device and/or remote automated assistant components such as speech recognition component(s), voice activity detection component(s), etc. Further, recognized text (from the speech recognition component(s)) can be processed using natural language understanding engine(s) and/or action(s) can be performed based on the natural language understanding engine output. The action(s) can include, for example, generating and providing a response and/or controlling one or more application(s) and/or smart device(s)). Other hotwords (e.g., "No", "Stop", "Cancel", "Volume Up", "Volume Down", "Next Track", "Previous Track", etc.) may be mapped to various commands, and when the predicted output indicates that one of these hotwords is present, the mapped command may be processed by the client device. However, when the predicted output indicates that a hotword is not present, corresponding audio data will be discarded without any further processing, thereby conserving resources and user privacy.

Some environments may include multiple client devices that each include one or more automated assistants, which may be different automated assistants (e.g., automated assistants from multiple providers) and/or multiple instances of the same automated assistant. In certain situations, the multiple client devices may be positioned close enough to each other such that they each receive, via one or more microphones, audio data that captures a spoken utterance of a user and may each be able to respond to a query included in the spoken utterance.

The above-mentioned and/or other machine learning models (e.g., additional machine learning models described below), whose predicted output dictates whether automated assistant function(s) are activated, perform well in many situations. However, in certain situations, such as when multiple automated assistant devices (client devices) each including one or more automated assistants are located in an environment, an audio segment from digital media (e.g., a podcast, movie, television show, etc.) being played back by an automated assistant included on a first automated assistant device in the environment may be processed by an automated assistant included on a second automated assistant device in the environment (or by multiple other automated assistants included on multiple other automated assistant devices in the environment). In the case where audio data processed by the second automated assistant (or by multiple other automated assistants) includes the audio segment from digital media being played back by the first automated assistant, when one or more hotwords or words that sound similar to hotwords are present in the audio segment, the hotword detection model of the second automated assistant (or of the multiple other automated assistants) may detect the one or more hotwords or similar-sounding words from the audio segment. This may be particularly likely to occur as the number of client devices that include automated assistants or the density of client devices that include automated assistants in an environment (e.g., a household) increases or as the number of active hotwords (including warm words) increases. The second automated assistant (or multiple other automated assistants) may then process any audio from the media content that follows within a threshold amount of time of the one or more hotwords or similar-sounding words and respond to a request in the media content. Alternatively, the automated assistant(s) may perform one or more action(s) (e.g., increasing or decreasing audio volume) corresponding to the detected hotword(s).

The activation of the second automated assistant (or multiple other automated assistants) based upon one or more hotwords or similar-sounding words present in the audio segment from digital media being played back by the first automated assistant may be unintended by the user and may lead to a negative user experience (e.g., the second automated assistant may respond even though the user did not make a request and/or perform actions that the user does not wish to be performed). Occurrences of unintended activations of the automated assistant can waste network and/or computational resources and potentially force the human to make a request for the automated assistant to undo an undesired action (e.g., the user may issue a "Volume Down" command to counteract an unintended "Volume Up" command present in media content that triggered the automated assistant to increase a volume level).

SUMMARY

Some implementations disclosed herein are directed to improving performance of machine learning model(s) by detecting and suppressing commands in media that may trigger another automated assistant. As described in more detail herein, such machine learning models can include, for example, hotword detection models and/or other machine learning models. Various implementations include an automated assistant that discovers other client devices executing other automated assistants and proactively takes action to prevent the other automated assistants running on the other client devices from incorrectly triggering on digital media being played back by the automated assistant. In some implementations, in response to detecting audio segments of media content which are likely to trigger nearby client devices executing automated assistants, the system automatically suppresses the triggers in the audio segments.

In some implementations, the system determines which devices are currently around the media playback device(s), along with their current state and active capabilities. For example, one nearby device might be listening for a hotword "Hey Assistant 1", and another for "OK Assistant 2". Alternatively, one of the devices might be in active conversation with a user and would therefore accept any speech input.

In some implementations, the system discovers other devices in an environment and maintains awareness of a current state of each of the other devices in the environment via an application programming interface (API) (e.g., if the other devices include other instances of the same automated assistant, e.g., from the same provider) and/or based on analysis of prior interactions that were overheard and taking into account nearby device types or capabilities (e.g., if the other devices include different automated assistants, e.g., from different providers).

In some implementations, the system prevents unnecessary automated assistant triggers while media is being played by, in response to detecting audio segments of media content which are likely to trigger nearby client devices executing automated assistants, automatically suppressing triggers in audio segments. In some implementations, by automatically suppressing the triggers, the system may avoid negative user experiences and unnecessary consumption of bandwidth and power by reducing unintended activations of the automated assistant.

In various implementations, a method implemented by one or more processors may include determining, by a client device, for each of a plurality of automated assistant devices in an environment that are each executing at least one automated assistant, an active capability of the automated assistant device; initiating playback of digital media by an automated assistant executing at least in part on the client device; in response to initiating playback, the client device processing the digital media to identify an audio segment in the digital media that, upon playback, is expected to trigger activation of at least one automated assistant executing on at least one of the plurality of automated assistant devices in the environment, based on the active capability of the at least one of the plurality of automated assistant devices; and in response to identifying the audio segment in the digital media, the client device modifying the digital media to suppress the activation of the at least one automated assistant executing on at least one of the plurality of automated assistant devices in the environment.

In some implementations, the method may further include discovering, by the client device, each of the plurality of automated assistant devices in the environment using a wireless communication protocol. In some implementations, the method may further include determining, by the client device, a proximity of each of the plurality of automated assistant devices to the client device using calibration sounds or wireless/radio signal strength analysis. In some implementations, the client device processing the digital media to identify the audio segment is further in response to determining that a volume level associated with playback of the digital media satisfies a threshold determined based on the proximity of each of the plurality of automated assistant devices to the client device.

In some implementations, the determining the active capability of the automated assistant device may include one or more of: determining whether or not the automated assistant device is performing hotword detection; determining whether or not the automated assistant device is performing open-ended automatic speech recognition; and determining whether or not the automated assistant device is listening for specific voices.

In some implementations, the client device processing the digital media to identify the audio segment is further based on an output of a speaker identification model and in response to determining that the active capability of one or more of the plurality of automated assistant devices includes performing hotword detection or performing open-ended automatic speech recognition. In some implementations, the client device processing the digital media to identify the audio segment includes processing the digital media using a hotword detection model to detect potential triggers in the digital media. In some implementations, the client device modifying the digital media includes inserting a digital watermark into an audio track of the digital media.

In some additional or alternative implementations, a computer program product may include one or more computer-readable storage media having program instructions collectively stored on the one or more computer-readable storage media. The program instructions may be executable to: determine, by a client device, for each of a plurality of automated assistant devices in an environment that are each executing at least one automated assistant, an active capability of the automated assistant device; initiate playback of digital media by an automated assistant executing at least in part on the client device; in response to initiating playback, process the digital media, by the client device, to identify an audio segment in the digital media that, upon playback, is expected to trigger activation of at least one automated assistant executing on at least one of the plurality of automated assistant devices in the environment, based on the active capability of the at least one of the plurality of automated assistant devices; and in response to identifying the audio segment in the digital media, communicate, by the client device, with at least one of the plurality of automated assistant devices in the environment to cause the activation of the at least one automated assistant executing on the at least one of the plurality of automated assistant devices in the environment to be suppressed during playback of the audio segment.

In some implementations, the communicating with at least one of the plurality of automated assistant devices in the environment to cause the activation of the at least one automated assistant executing on the at least one of the plurality of automated assistant devices in the environment to be suppressed during playback of the audio segment includes: providing at least a portion of the audio segment or a fingerprint based on the audio segment to at least one of the plurality of automated assistant devices; or providing an instruction to at least one of the plurality of automated assistant devices to stop listening at a time corresponding to the audio segment.

In some additional or alternative implementations, a system may include a processor, a computer-readable memory, one or more computer-readable storage media, and program instructions collectively stored on the one or more computer-readable storage media. The program instructions may be executable to: determine, by a client device, for each of a plurality of automated assistant devices in an environment that are each executing at least one automated assistant, an active capability of the automated assistant device; initiate playback of digital media by an automated assistant executing at least in part on the client device; in response to initiating playback, process, by the client device, the digital media to identify an audio segment in the digital media that, upon playback, is expected to trigger activation of at least one automated assistant executing on at least one of the plurality of automated assistant devices in the environment, based on the active capability of the at least one of the plurality of automated assistant devices; and in response to identifying the audio segment in the digital media, modify, by the client device, the digital media to suppress the activation of the at least one automated assistant executing on at least one of the plurality of automated assistant devices in the environment.

Through utilization of one or more techniques described herein, the automated assistant can improve performance by detecting and suppressing commands in media to avoid triggering an unintended activation of another automated assistant that can waste network and/or computational resources and potentially force the human to make a request for the automated assistant to undo an undesired action.

The above description is provided as an overview of some implementations of the present disclosure. Further description of those implementations, and other implementations, are described in more detail below.

Various implementations can include a non-transitory computer readable storage medium storing instructions executable by one or more processors (e.g., central processing unit(s) (CPU(s)), graphics processing unit(s) (GPU(s)), digital signal processor(s) (DSP(s)), and/or tensor processing unit(s) (TPU(s)) to perform a method such as one or more of the methods described herein. Other implementations can include an automated assistant client device (e.g., a client device including at least an automated assistant interface for interfacing with cloud-based automated assistant component(s)) that includes processor(s) operable to execute stored instructions to perform a method, such as one or more of the methods described herein. Yet other implementations can include a system of one or more servers that include one or more processors operable to execute stored instructions to perform a method such as one or more of the methods described herein.

DETAILED DESCRIPTION

Figure 1A:
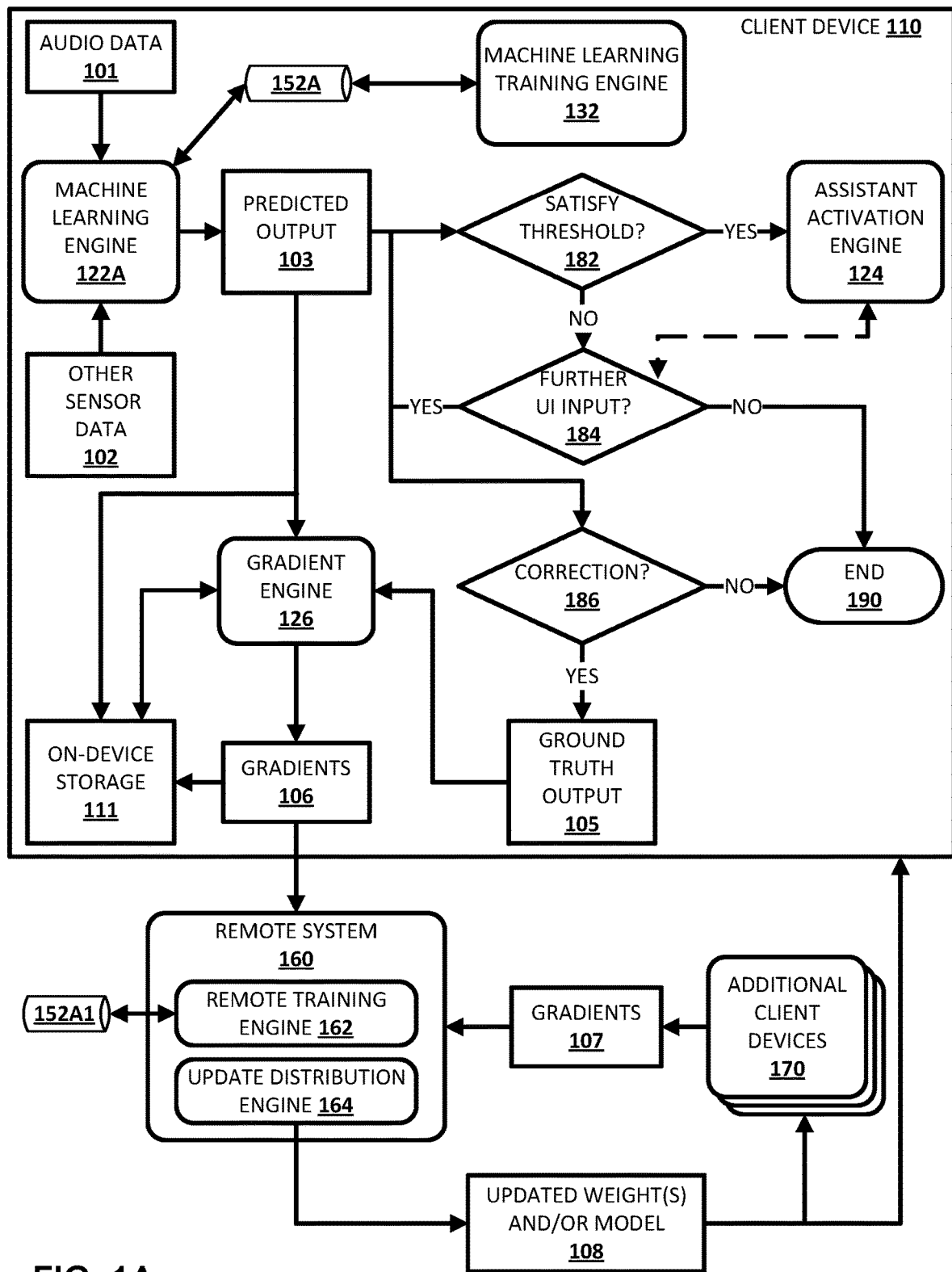
FIG. 1A and FIG. 1B depict example process flows that demonstrate various aspects of the present disclosure, in accordance with various implementations.
Figure 1B:
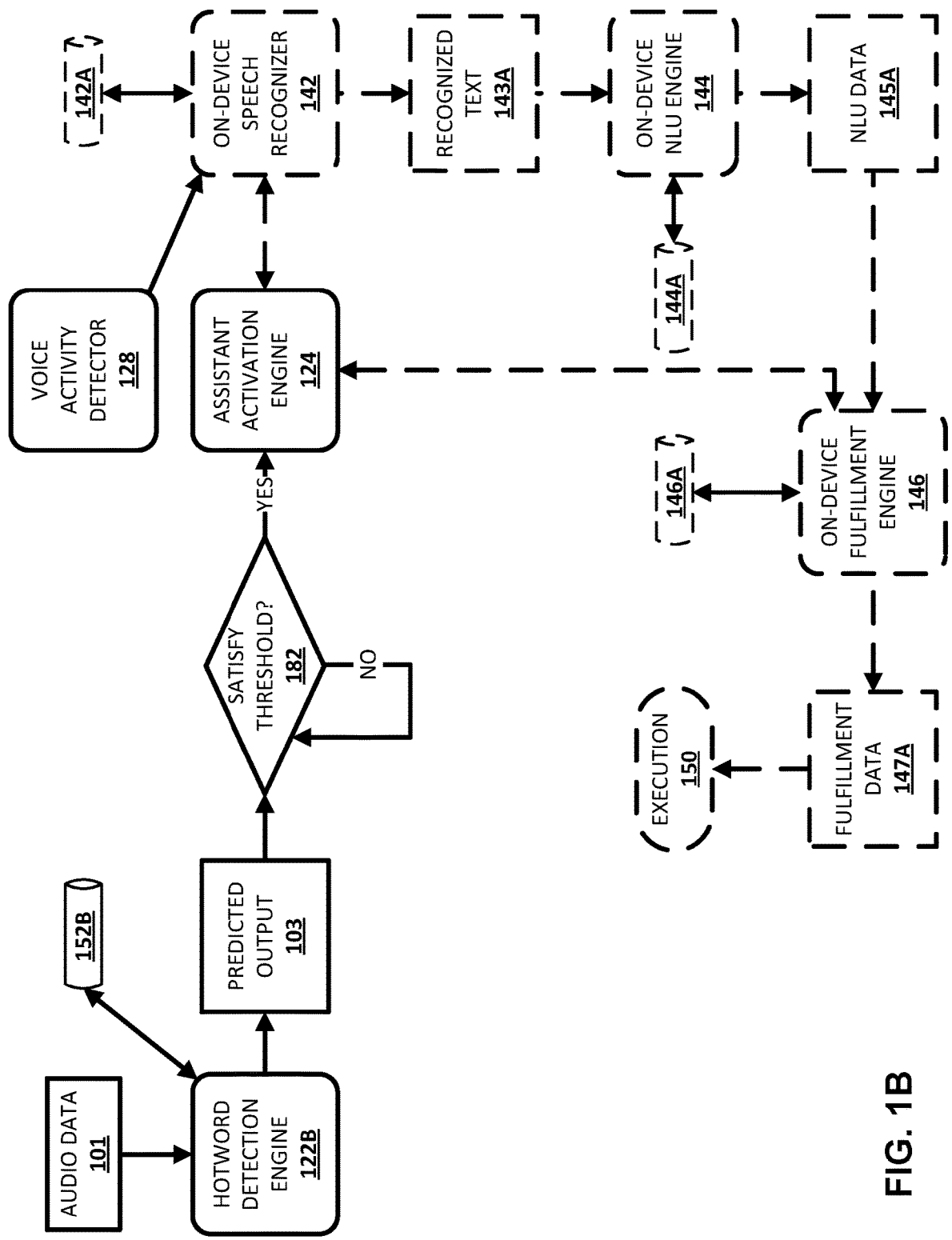

FIGS. 1A and 1B depict example process flows that demonstrate various aspects of the present disclosure. A client device 110 is illustrated in FIG. 1A, and includes the components that are encompassed within the box of FIG. 1A that represents the client device 110. Machine learning engine 122A can receive audio data 101 corresponding to a spoken utterance detected via one or more microphones of the client device 110 and/or other sensor data 102 corresponding to utterance free physical movement(s) (e.g., hand gesture(s) and/or movement(s), body gesture(s) and/or body movement(s), eye gaze, facial movement, mouth movement, etc.) detected via one or more non-microphone sensor components of the client device 110. The one or more non-microphone sensors can include camera(s) or other vision sensor(s), proximity sensor(s), pressure sensor(s), accelerometer(s), magnetometer(s), and/or other sensor(s). The machine learning engine 122A processes the audio data 101 and/or the other sensor data 102, using machine learning model 152A, to generate a predicted output 103. As described herein, the machine learning engine 122A can be a hotword detection engine 122B or an alternative engine, such as a voice activity detector (VAD) engine, an endpoint detector engine, a speech recognition (ASR) engine, and/or other engine(s).

In some implementations, when the machine learning engine 122A generates the predicted output 103, it can be stored locally on the client device in on-device storage 111, and optionally in association with the corresponding audio data 101 and/or the other sensor data 102. In some versions of those implementations, the predicted output can be retrieved by gradient engine 126 for utilization in generating gradients 106 at a later time, such as when one or more conditions described herein are satisfied. The on-device storage 111 can include, for example, read-only memory (ROM) and/or random-access memory (RAM). In other implementations, the predicted output 103 can be provided to the gradient engine 126 in real-time.

The client device 110 can make a decision, based on determining whether the predicted output 103 satisfies a threshold at block 182, of whether to initiate currently dormant automated assistant function(s) (e.g., automated assistant 295 of FIG. 2), refrain from initiating currently dormant automated assistant function(s), and/or shut down currently active automated assistant function(s) using an assistant activation engine 124. The automated assistant functions can include: speech recognition to generate recognized text, natural language understanding (NLU) to generate NLU output, generating a response based on the recognized text and/or the NLU output, transmission of the audio data to a remote server, transmission of the recognized text to the remote server, and/or directly triggering one or more actions that are responsive to the audio data 101 (e.g., a common task such as changing the device volume). For example, assume the predicted output 103 is a probability (e.g., 0.80 or 0.90) and the threshold at block 182 is a threshold probability (e.g., 0.85). If the client device 110 determines the predicted output 103 (e.g., 0.90) satisfies the threshold (e.g., 0.85) at block 182, then the assistant activation engine 124 can initiate the currently dormant automated assistant function(s).

In some implementations, and as depicted in FIG. 1B, the machine learning engine 122A can be a hotword detection engine 122B. Notably, various automated assistant function(s), such as on-device speech recognizer 142, on-device NLU engine 144, and/or on-device fulfillment engine 146, are currently dormant (i.e., as indicated by dashed lines). Further, assume that the predicted output 103, generated using a hotword detection model 152B and based on the audio data 101, satisfies the threshold at block 182, and that voice activity detector 128 detects user speech directed to the client device 110.

In some versions of these implementations, the assistant activation engine 124 activates the on-device speech recognizer 142, the on-device NLU engine 144, and/or the on-device fulfillment engine 146 as the currently dormant automated assistant function(s). For example, the on-device speech recognizer 142 can process the audio data 101 for a spoken utterance, including a hotword "OK Assistant" and additional commands and/or phrases that follow the hotword "OK Assistant", using on-device speech recognition model 142A, to generate recognized text 143A, the on-device NLU engine 144 can process the recognized text 143A, using on-device NLU model 144A, to generate NLU data 145A, the on-device fulfillment engine 146 can process the NLU data 145A, using on-device fulfillment model 146A, to generate fulfillment data 147A, and the client device 110 can use the fulfillment data 147A in execution 150 of one or more actions that are responsive to the audio data 101.

In other versions of these implementations, the assistant activation engine 124 activates the only on-device fulfillment engine 146, without activating the on-device speech recognizer 142 and the on-device NLU engine 144, to process various commands, such as "No", "Stop", "Cancel", "Volume Up", "Volume Down", "Next Track", "Previous Track", and/or other commands that can be processed without the on-device speech recognizer 142 and the on-device NLU engine 144. For example, the on-device fulfillment engine 146 processes the audio data 101, using the on-device fulfillment model 146A, to generate the fulfillment data 147A, and the client device 110 can use the fulfillment data 147A in execution 150 of one or more actions that are responsive to the audio data 101. Moreover, in versions of these implementations, the assistant activation engine 124 can initially activate the currently dormant automated function(s) to verify the decision made at block 182 was correct (e.g., the audio data 101 does in fact include the hotword "OK Assistant") by initially only activating the on-device speech recognizer 142 to determine the audio data 101 include the hotword "OK Assistant", and/or the assistant activation engine 124 can transmit the audio data 101 to one or more servers (e.g., remote server 160) to verify the decision made at block 182 was correct (e.g., the audio data 101 does in fact include the hotword "OK Assistant").

Turning back to FIG. 1A, if the client device 110 determines the predicted output 103 (e.g., 0.80) fails to satisfy the threshold (e.g., 0.85) at block 182, then the assistant activation engine 124 can refrain from initiating the currently dormant automated assistant function(s) and/or shut down any currently active automated assistant function(s). Further, if the client device 110 determines the predicted output 103 (e.g., 0.80) fails to satisfy the threshold (e.g., 0.85) at block 182, then the client device 110 can determine if further user interface input is received at block 184. For example, the further user interface input can be an additional spoken utterance that includes a hotword, additional utterance free physical movement(s) that serve as a proxy for a hotword, actuation of an explicit automated assistant invocation button (e.g., a hardware button or software button), a sensed "squeeze" of the client device 110 device (e.g., when squeezing the client device 110 with at least a threshold amount of force invokes the automated assistant), and/or other explicit automated assistant invocation. If the client device 110 determines there is no further user interface input received at block 184, then the client device 110 can end at block 190.

However, if the client device 110 determines there is further user interface input received at block 184, then the system can determine whether the further user interface input received at block 184 includes correction(s) at block 186 that contradict the decision made at block 182. If the client device 110 determines the further user interface input received at block 184 does not include a correction at block 186, the client device 110 can stop identifying corrections and end at block 190. However, if the client device 110 determines that the further user interface input received at block 184 includes a correction at block 186 that contradicts the initial decision made at block 182, then the client device 110 can determine ground truth output 105.

In some implementations, the gradient engine 126 can generate the gradients 106 based on the predicted output 103 to the ground truth output 105. For example, the gradient engine 126 can generate the gradients 106 based on comparing the predicted output 103 to the ground truth output 105. In some versions of those implementations, the client device 110 stores, locally in the on-device storage 111, the predicted output 103 and the corresponding ground truth output 105, and the gradient engine 126 retrieves the predicted output 103 and the corresponding ground truth output 105 to generate the gradients 106 when one or more conditions are satisfied. The one or more conditions can include, for example, that the client device is charging, that the client device has at least a threshold state of charge, that a temperature of the client device (based on one or more on-device temperature sensors) is less than a threshold, and/or that the client device is not being held by a user. In other versions of those implementations, the client device 110 provides the predicted output 103 and the ground truth output 105 to the gradient engine 126 in real-time, and the gradient engine 126 generates the gradients 106 in real-time.

Moreover, the gradient engine 126 can provide the generated gradients 106 to on-device machine learning training engine 132A. The on-device machine learning training engine 132A, when it receives the gradients 106, uses the gradients 106 to update the on-device machine learning model 152A. For example, the on-device machine learning training engine 132A can utilize backpropagation and/or other techniques to update the on-device machine learning model 152A. It is noted that, in some implementations, the on-device machine learning training engine 132A can utilize batch techniques to update the on-device machine learning model 152A based on the gradients 106 and additional gradients determined locally at the client device 110 on the basis of additional corrections.

Further, the client device 110 can transmit the generated gradients 106 to a remote system 160. When the remote system 160 receives the gradients 106, a remote training engine 162 of the remote system 160 uses the gradients 106, and additional gradients 107 from additional client devices 170, to update global weights of a global hotword model 152A1. The additional gradients 107 from the additional client devices 170 can each be generated based on the same or similar technique as described above with respect to the gradients 106 (but on the basis of locally identified failed hotword attempts that are particular to those client devices).

An update distribution engine 164 can, responsive to one or more conditions being satisfied, provide, to the client device 110 and/or other client device(s), the updated global weights and/or the updated global hotword model itself, as indicated by 108. The one or more conditions can include, for example, a threshold duration and/or quantity of training since updated weights and/or an updated speech recognition model was last provided. The one or more conditions can additionally or alternatively include, for example, a measured improvement to the updated speech recognition model and/or passage of a threshold duration of time since updated weights and/or an updated speech recognition model was last provided. When the updated weights are provided to the client device 110, the client device 110 can replace weights, of the on-device machine learning model 152A, with the updated weights. When the updated global hotword model is provided to the client device 110, the client device 110 can replace the on-device machine learning model 152A with the updated global hotword model. In other implementations, the client device 110 may download a more suitable hotword model (or models) from a server based on the types of commands the user expects to speak and replace the on-device machine learning model 152A with the downloaded hotword model.

In some implementations, the on-device machine learning model 152A is transmitted (e.g., by the remote system 160 or other component(s)) for storage and use at the client device 110, based on a geographic region and/or other properties of the client device 110 and/or a user of the client device 110. For example, the on-device machine learning model 152A can be one of N available machine learning models for a given language, but can be trained based on corrections that are specific to a particular geographic region, device type, context (e.g., music playing), etc., and provided to client device 110 based on the client device 110 being primarily located in the particular geographic region.

Figure 2:
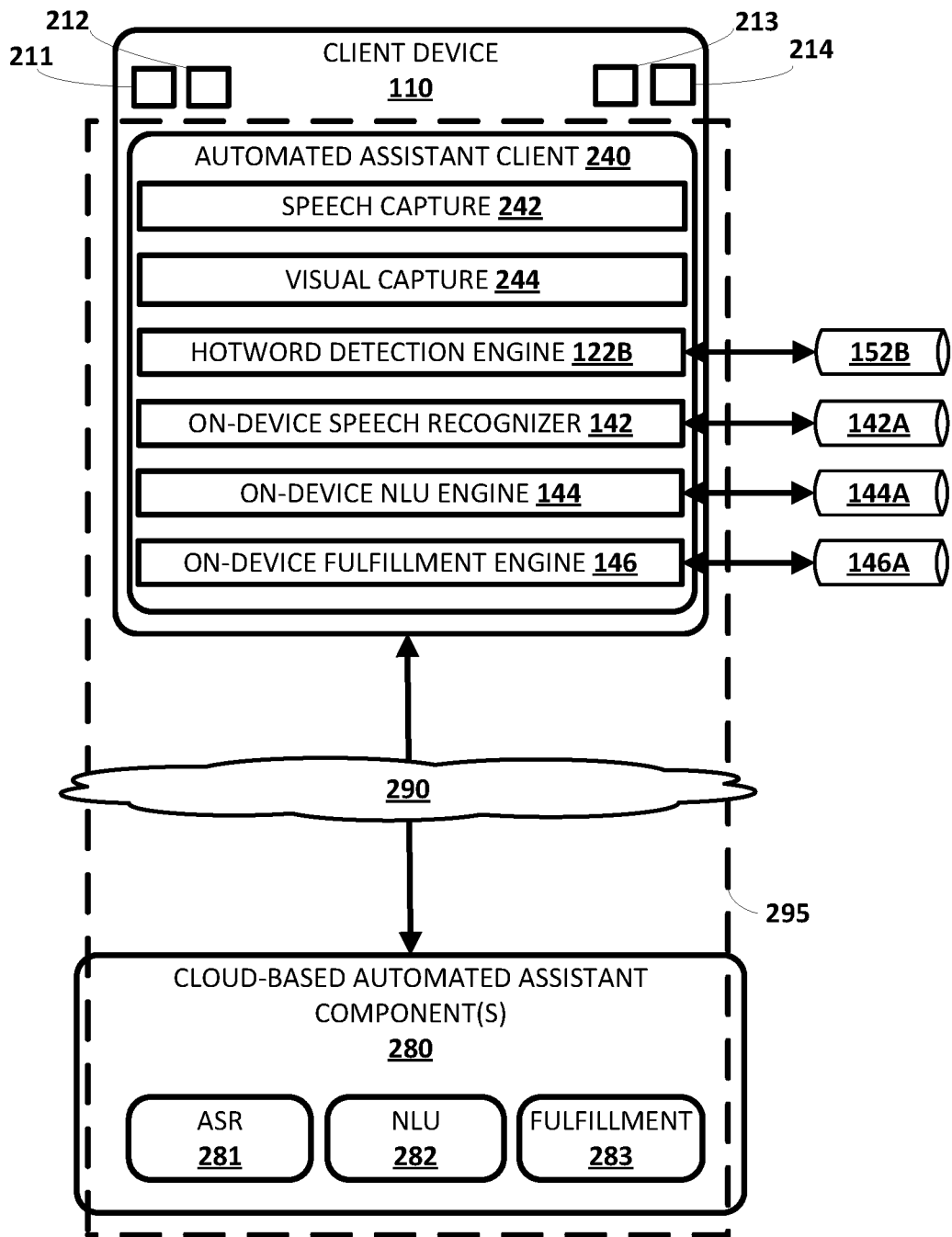
FIG. 2 depicts a block diagram of an example environment that includes various components from FIGS. 1A and 1B, and in which implementations disclosed herein may be implemented.

Turning now to FIG. 2, client device 110 is illustrated in an implementation where the various on-device machine learning engines of FIGS. 1A and 1B are included as part of (or in communication with) an automated assistant client 240. The respective machine learning models are also illustrated interfacing with the various on-device machine learning engines of FIGS. 1A and 1B. Other components from FIGS. 1A and 1B are not illustrated in FIG. 2 for simplicity. FIG. 2 illustrates one example of how the various on-device machine learning engines of FIGS. 1A and 1B and their respective machine learning models can be utilized by the automated assistant client 240 in performing various actions.

The client device 110 in FIG. 2 is illustrated with one or more microphones 211, one or more speakers 212, one or more cameras and/or other vision components 213, and display(s) 214 (e.g., a touch-sensitive display). The client device 110 may further include pressure sensor(s), proximity sensor(s), accelerometer(s), magnetometer(s), and/or other sensor(s) that are used to generate other sensor data that is in addition to audio data captured by the one or more microphones 211. The client device 110 at least selectively executes the automated assistant client 240. The automated assistant client 240 includes, in the example of FIG. 2, the on-device hotword detection engine 122B, the on-device speech recognizer 142, the on-device natural language understanding (NLU) engine 144, and the on-device fulfillment engine 146. The automated assistant client 240 further includes speech capture engine 242 and visual capture engine 244. The automated assistant client 140 can include additional and/or alternative engines, such as a voice activity detector (VAD) engine, an endpoint detector engine, and/or other engine(s).

One or more cloud-based automated assistant components 280 can optionally be implemented on one or more computing systems (collectively referred to as a "cloud" computing system) that are communicatively coupled to client device 110 via one or more local and/or wide area networks (e.g., the Internet) indicated generally at 290. The cloud-based automated assistant components 280 can be implemented, for example, via a cluster of high-performance servers.

In various implementations, an instance of an automated assistant client 240, by way of its interactions with one or more cloud-based automated assistant components 280, may form what appears to be, from a user's perspective, a logical instance of an automated assistant 295 with which the user may engage in human-to-computer interactions (e.g., spoken interactions, gesture-based interactions, and/or touch-based interactions).

The client device 110 can be, for example: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television (or a standard television equipped with a networked dongle with automated assistant capabilities), and/or a wearable apparatus of the user that includes a computing device (e.g., a watch of the user having a computing device, glasses of the user having a computing device, a virtual or augmented reality computing device). Additional and/or alternative client devices may be provided.

The one or more vision components 213 can take various forms, such as monographic cameras, stereographic cameras, a LIDAR component (or other laser-based component(s)), a radar component, etc. The one or more vision components 213 may be used, e.g., by the visual capture engine 242, to capture vision frames (e.g., image frames, laser-based vision frames) of an environment in which the client device 110 is deployed. In some implementations, such vision frame(s) can be utilized to determine whether a user is present near the client device 110 and/or a distance of the user (e.g., the user's face) relative to the client device 110. Such determination(s) can be utilized, for example, in determining whether to activate the various on-device machine learning engines depicted in FIG. 2, and/or other engine(s).

Speech capture engine 242 can be configured to capture user's speech and/or other audio data captured via microphone(s) 211. Further, the client device 110 may include pressure sensor(s), proximity sensor(s), accelerometer(s), magnetometer(s), and/or other sensor(s) that are used to generate other sensor data that is in addition to the audio data captured via the microphone(s) 211. As described herein, such audio data and other sensor data can be utilized by the hotword detection engine 122B and/or other engine(s) to determine whether to initiate one or more currently dormant automated assistant functions, refrain from initiating one or more currently dormant automated assistant functions, and/or shut down one or more currently active automated assistant functions. The automated assistant functions can include the on-device speech recognizer 142, the on-device NLU engine 144, the on-device fulfillment engine 146, and additional and/or alternative engines. For example, on-device speech recognizer 142 can process audio data that captures a spoken utterance, utilizing on-device speech recognition model 142A, to generate recognized text 143A that corresponds to the spoken utterance. On-device NLU engine 144 performs on-device natural language understanding, optionally utilizing on-device NLU model 144A, on the recognized text 143A to generate NLU data 145A. The NLU data 145A can include, for example, intent(s) that correspond to the spoken utterance and optionally parameter(s) (e.g., slot values) for the intent(s). Further, the on-device fulfillment engine 146 generates the fulfillment data 147A, optionally utilizing on-device fulfillment model 146A, based on the NLU data 145A. This fulfillment data 147A can define local and/or remote responses (e.g., answers) to the spoken utterance, interaction(s) to perform with locally installed application(s) based on the spoken utterance, command(s) to transmit to Internet-of-things (IoT) device(s) (directly or via corresponding remote system(s)) based on the spoken utterance, and/or other resolution action(s) to perform based on the spoken utterance. The fulfillment data 147A is then provided for local and/or remote performance/execution of the determined action(s) to resolve the spoken utterance. Execution can include, for example, rendering local and/or remote responses (e.g., visually and/or audibly rendering (optionally utilizing a local text-to-speech module)), interacting with locally installed applications, transmitting command(s) to IoT device(s), and/or other action(s).

Display(s) 214 can be utilized to display the recognized text 143A and/or the further recognized text 143E3 from the on-device speech recognizer 122, and/or one or more results from the execution 150. Display(s) 214 can further be one of the user interface output component(s) through which visual portion(s) of a response, from the automated assistant client 240, is rendered.

In some implementations, cloud-based automated assistant component(s) 280 can include a remote ASR engine 281 that performs speech recognition, a remote NLU engine 282 that performs natural language understanding, and/or a remote fulfillment engine 283 that generates fulfillment. A remote execution module can also optionally be included that performs remote execution based on local or remotely determined fulfillment data. Additional and/or alternative remote engines can be included. As described herein, in various implementations on-device speech processing, on-device NLU, on-device fulfillment, and/or on-device execution can be prioritized at least due to the latency and/or network usage reductions they provide when resolving a spoken utterance (due to no client-server roundtrip(s) being needed to resolve the spoken utterance). However, one or more cloud-based automated assistant component(s) 280 can be utilized at least selectively. For example, such component(s) can be utilized in parallel with on-device component(s) and output from such component(s) utilized when local component(s) fail. For example, the on-device fulfillment engine 146 can fail in certain situations (e.g., due to relatively limited resources of client device 110) and remote fulfillment engine 283 can utilize the more robust resources of the cloud to generate fulfillment data in such situations. The remote fulfillment engine 283 can be operated in parallel with the on-device fulfillment engine 146 and its results utilized when on-device fulfillment fails, or can be invoked responsive to determining failure of the on-device fulfillment engine 146.

In various implementations, an NLU engine (on-device and/or remote) can generate NLU data that includes one or more annotations of the recognized text and one or more (e.g., all) of the terms of the natural language input. In some implementations an NLU engine is configured to identify and annotate various types of grammatical information in natural language input. For example, an NLU engine may include a morphological module that may separate individual words into morphemes and/or annotate the morphemes, e.g., with their classes. An NLU engine may also include a part of speech tagger configured to annotate terms with their grammatical roles. Also, for example, in some implementations an NLU engine may additionally and/or alternatively include a dependency parser configured to determine syntactic relationships between terms in natural language input.

In some implementations, an NLU engine may additionally and/or alternatively include an entity tagger configured to annotate entity references in one or more segments such as references to people (including, for instance, literary characters, celebrities, public figures, etc.), organizations, locations (real and imaginary), and so forth. In some implementations, an NLU engine may additionally and/or alternatively include a coreference resolver (not depicted) configured to group, or "cluster," references to the same entity based on one or more contextual cues. In some implementations, one or more components of an NLU engine may rely on annotations from one or more other components of the NLU engine.

An NLU engine may also include an intent matcher that is configured to determine an intent of a user engaged in an interaction with automated assistant 295. An intent matcher can use various techniques to determine an intent of the user. In some implementations, an intent matcher may have access to one or more local and/or remote data structures that include, for instance, a plurality of mappings between grammars and responsive intents. For example, the grammars included in the mappings can be selected and/or learned over time, and may represent common intents of users. For example, one grammar, "play <artist>", may be mapped to an intent that invokes a responsive action that causes music by the <artist> to be played on the client device 110. Another grammar, "[weather|forecast] today," may be match-able to user queries such as "what's the weather today" and "what's the forecast for today?" In addition to or instead of grammars, in some implementations, an intent matcher can employ one or more trained machine learning models, alone or in combination with one or more grammars. These trained machine learning models can be trained to identify intents, e.g., by embedding recognized text from a spoken utterance into a reduced dimensionality space, and then determining which other embeddings (and therefore, intents) are most proximate, e.g., using techniques such as Euclidean distance, cosine similarity, etc. As seen in the "play <artist>" example grammar above, some grammars have slots (e.g., <artist>) that can be filled with slot values (or "parameters"). Slot values may be determined in various ways. Often users will provide the slot values proactively. For example, for a grammar "Order me a <topping> pizza," a user may likely speak the phrase "order me a sausage pizza," in which case the slot <topping> is filled automatically. Other slot value(s) can be inferred based on, for example, user location, currently rendered content, user preferences, and/or other cue(s).

A fulfillment engine (local and/or remote) can be configured to receive the predicted/estimated intent that is output by an NLU engine, as well as any associated slot values and fulfill (or "resolve") the intent. In various implementations, fulfillment (or "resolution") of the user's intent may cause various fulfillment information (also referred to as fulfillment data) to be generated/obtained, e.g., by fulfillment engine. This can include determining local and/or remote responses (e.g., answers) to the spoken utterance, interaction(s) with locally installed application(s) to perform based on the spoken utterance, command(s) to transmit to Internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

Figure 3:
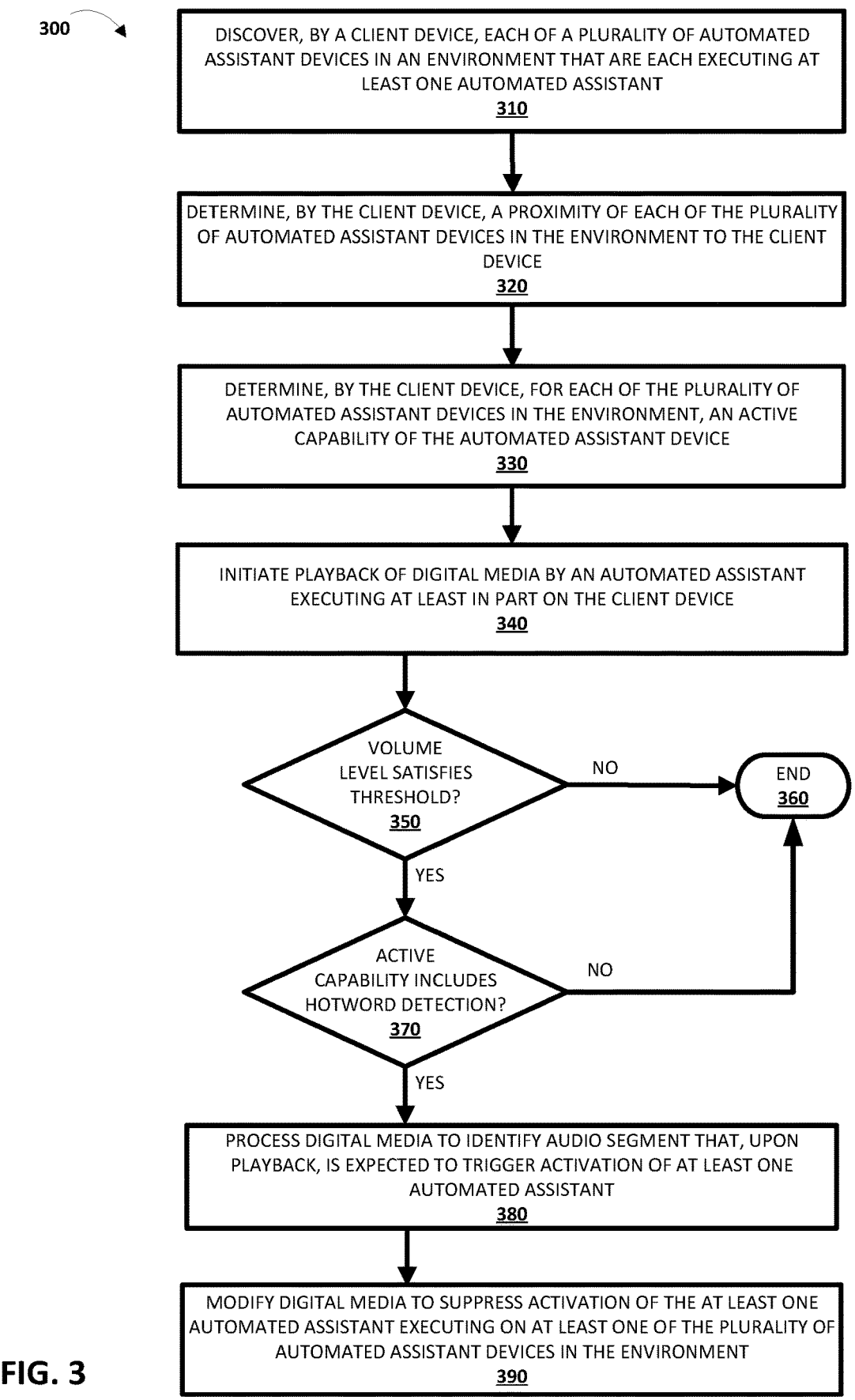
FIG. 3 depicts a flowchart illustrating an example method of detecting and suppressing commands in media that may trigger another automated assistant, in accordance with various implementations.

FIG. 3 depicts a flowchart illustrating an example method 300 of detecting and suppressing commands in media that may trigger another automated assistant. For convenience, the operations of the method 300 are described with reference to a system that performs the operations. This system of method 300 includes one or more processors and/or other component(s) of a client device. Moreover, while operations of the method 300 are shown in a particular order, this is not meant to be limiting. One or more operations may be reordered, omitted, or added.

At block 310, the system discovers, by a client device, each of a plurality of automated assistant devices in an environment that are each executing at least one automated assistant, using a wireless communication protocol. In some implementations, an automated assistant running on the client device may discover each of the plurality of automated assistant devices in the environment (e.g., a user's home) using an API based on a wireless communication protocol (e.g., WiFi or Bluetooth). Block 310 may be repeated on an ongoing basis (e.g., at a predetermined time interval), such that additions or deletions to the automated assistant devices in the environment are discovered by the client device.

At block 320, the system determines, by the client device, a proximity of each of the plurality of automated assistant devices in the environment (discovered at block 310) to the client device using calibration sounds or wireless signal strength analysis. Block 320 may be repeated on an ongoing basis (e.g., at a predetermined time interval), such that changes in proximity (e.g., due to repositioning of automated assistant devices in the environment) are identified.

At block 330, the system determines, by the client device, for each of the plurality of automated assistant devices in the environment (discovered at block 310), an active capability of the automated assistant device. In some implementations, the determining the active capability of the automated assistant device includes one or more of determining whether or not the automated assistant device is performing hotword detection (or key phrase detection), determining whether or not the automated assistant device is performing open-ended automatic speech recognition, and determining whether or not the automated assistant device is listening for specific voices.

Still referring to block 330, in some implementations, the client device may determine the active capability using an API which declares a current state of the automated assistant devices. In other implementations, the client device may determine the active capability via static knowledge of capabilities of particular automated assistant devices (e.g., automated assistant device type 1 may always listen for "Hey Device 1"). In other implementations, the client device may rely on ambient awareness to determine the active capability. For example, the client device may process and detect interactions with other automated assistants that are nearby and track the state of the other automated assistant devices. Block 330 may be repeated on an ongoing basis (e.g., at a predetermined time interval), such that changes in active capability (e.g., due to changes in state of the automated assistant devices) are identified. For some devices, certain active capabilities may remain unchanged over time, e.g., if a hotword model is always active on a particular automated assistant device.

In some implementations, by discovering the plurality of automated assistant devices in the environment at block 310, discovering the proximity of each of the plurality of automated assistant devices in the environment at block 320, and determining the active capability for each of the plurality of automated assistant devices in the environment at block 330, the client device maintains information regarding a set of nearby automated assistant devices and a set of respective capabilities that are known to be active on those nearby automated assistant devices. There may be some overlap between the capabilities. For example, multiple automated assistant devices may be listening for a particular hotword, or listening for a particular key phrase (e.g., "play music").

At block 340, the system initiates playback of digital media by an automated assistant executing at least in part on the client device. In some implementations, playback may be initiated via a spoken utterance of the user that includes a request to initiate playback (e.g., "Hey Computer, play the latest episode of my favorite podcast"). In other implementations, playback may be initiated by a user casting content to a particular target device.

At block 350, the system determines whether or not a volume level associated with playback of the digital media (initiated at block 340) satisfies a threshold determined based on the proximity of each of the plurality of automated assistant devices to the client device (determined at block 320). The threshold may be a volume level that is sufficiently high, given the proximity (determined at block 320) of the automated assistant devices in the environment, such that the automated assistant devices would be triggered by any hotwords or commands present in the audio track of the digital media for which playback was initiated at block 340. If, at an iteration of block 350, the system determines that the volume level associated with playback of the digital media does not satisfy the threshold, then the system proceeds to block 360, and the flow ends. On the other hand, if, at an iteration of block 350, the system determines that the volume level associated with playback of the digital media satisfies the threshold, then the system proceeds to block 370.

At block 370, the system determines whether or not that the active capability (determined at block 330) of one or more of the plurality of automated assistant devices includes performing hotword detection or performing open-ended automatic speech recognition. If, at an iteration of block 370, the system determines that it is not the case that the active capability of one or more of the plurality of automated assistant devices includes performing hotword detection or performing open-ended automatic speech recognition, then the system proceeds to block 360, and the flow ends. On the other hand, if, at an iteration of block 370, the system determines that the active capability of one or more of the plurality of automated assistant devices includes performing hotword detection or performing open-ended automatic speech recognition, then the system proceeds to block 380.

In other implementations, at block 370, the client device may also run speaker identification models to detect if a voice in the content is expected to trigger activation of at least one automated assistant. If, at an iteration of block 370, the system determines it is not the case that the active capability of one or more of the plurality of automated assistant devices includes performing hotword detection or performing open-ended automatic speech recognition, and a voice in the content is expected to trigger activation of at least one automated assistant, then the system proceeds to block 360, and the flow ends. On the other hand, if, at an iteration of block 370, the system determines that it is the case that the active capability of one or more of the plurality of automated assistant devices includes performing hotword detection or performing open-ended automatic speech recognition, and a voice in the content is expected to trigger activation of at least one automated assistant, then the system proceeds to block 380.

At block 380, in response to the system initiating playback of the digital media (at block 340), determining that the volume level satisfies the threshold (at block 350), and determining that the active capability of one or more of the plurality of automated assistant devices includes performing hotword detection or performing open-ended automatic speech recognition (at block 370), the client device processes the digital media to identify an audio segment in the digital media that, upon playback, is expected to trigger activation of at least one automated assistant executing on at least one of the plurality of automated assistant devices in the environment, based on the active capability of the at least one of the plurality of automated assistant devices (determined at block 330). In some implementations, the client device may continuously analyze the digital media stream (e.g., using a lookahead buffer) to determine potential audio segments in the digital media which are expected to trigger automated assistant functions in other nearby devices. In some implementations, multiple audio segments may be identified at block 380 as audio segments that are expected to trigger activation of at least one automated assistant executing on at least one of the plurality of automated assistant devices in the environment.

Still referring to block 380, in some implementations, the client device processes the digital media using one or more hotword detection models to detect potential triggers in the digital media. For example, a first hotword detection model may be associated with both the client device and a first automated assistant device discovered at block 310 that listens for a first set of hotwords, and a second hotword detection model may be a proxy model that is associated with a second automated assistant device discovered at block 310 that listens for a second set of hotwords, the second automated assistant device having capabilities that are different from those of the client device. In some implementations, the hotword detection model(s) may include one or more machine learning models that generate a predicted output that indicates a probability of one or more hotwords being present in an audio segment in the digital media. The one or more machine learning models can be, for example, on-device hotword detection models and/or other machine learning models. Each of the machine learning models may be a deep neural network or any other type of model and may be trained to recognize one or more hotwords. Further, the generated output can be, for example, a probability and/or other likelihood measures.

Still referring to block 380, in some implementations, in response to the predicted output from one or more hotword detection models satisfying a threshold that is indicative of the one or more hotwords being present in the audio segment in the digital media, the client device may identify the audio segment as an audio segment in the digital media that, upon playback, is expected to trigger activation of at least one automated assistant (i.e., the automated assistant(s) associated with the one or more hotword detection models that generated the predicted output satisfying the threshold). In other implementations, the client device may also run speaker identification models to detect if a voice in the content is expected to trigger activation of at least one automated assistant. In an example, assume the predicted output is a probability and the probability must be greater than 0.85 to satisfy the threshold that is indicative of the one or more hotwords being present in the audio segment in the digital media, and the predicted probability is 0.88. Based on the predicted probability of 0.88 satisfying the threshold of 0.85, and further based upon output of a speaker identification model, the system identifies the audio segment in the digital media as an audio segment in the digital media that, upon playback, is expected to trigger activation of at least one automated assistant. In some implementations, the hotword detection model(s) may generate a predicted output that satisfies the threshold in the case of words or phrases that are acoustically similar to a hotword. In this case, an audio segment in the digital media that includes the acoustically similar words or phrases may be identified as an audio segment in the digital media that, upon playback, is expected to trigger activation of at least one automated assistant executing on at least one of the plurality of automated assistant devices in the environment.

Still referring to block 380, in other implementations, the client device processes the digital media using a speech recognizer to detect potential triggers in the digital media. In other implementations, the client device utilizes captions or subtitles included in the digital media to detect potential triggers in the digital media.

At block 390, in response to identifying the audio segment(s) in the digital media (at block 380), the client device modifies the digital media to suppress the activation of the at least one automated assistant executing on at least one of the plurality of automated assistant devices in the environment. In some implementations, the client device, in response to detecting a potential trigger for at least one of the plurality of automated assistant devices in the environment, performs proactive suppression to prevent other devices from incorrectly handling the audio segment(s) as automated assistant input.

Still referring to block 390, in some implementations, the client device modifies the digital media by inserting one or more digital watermarks into an audio track of the digital media (e.g., at location(s) in the audio track that correspond to or are adjacent to the audio segment(s)). The digital watermark may be an audio watermark, imperceptible to humans, that is recognizable by an automated assistant running on an automated assistant device, and that, upon recognition, may cause the automated assistant to avoid an unintended activation of automated assistant functions due to playback of the digital media including the audio segment(s) on the client device. In some implementations, the client device may communicate information about the audio watermark used to the automated assistants running on the automated assistant devices, in order for the automated assistants running on the automated assistant devices to recognize the audio watermark as a command to suppress activation of the automated assistants.

Still referring to block 390, in other implementations, the client device may modify the audio segment(s) before they are played back to ensure that the audio segment(s) will not trigger an automated assistant running on one or more of the automated assistant devices in the environment. For example, the client device may perform an adversarial modification to the audio segment(s). In other implementations, the client device may perform other transformations on the audio segment(s) depending on a type of trigger that is to be avoided. For example, if an automated assistant running on one or more of the automated assistant devices in the environment is expected to be triggered because the voice sounds too similar to one that would be accepted (e.g., as determined at block 330), the client device may apply a pitch change to the audio segment(s) to avoid triggering an automated assistant running on one or more of the automated assistant devices in the environment.

In some implementations, the system may provide a feedback mechanism to the user (e.g., via the client device) through which the user may be able to identify unintended activations of automated assistants. For example, the automated assistant running on the client device may ask the user, "Was this a mis-trigger?" when an automated assistant running on one of the automated assistant devices triggers during playback of the digital media on the client device.

Figure 4:
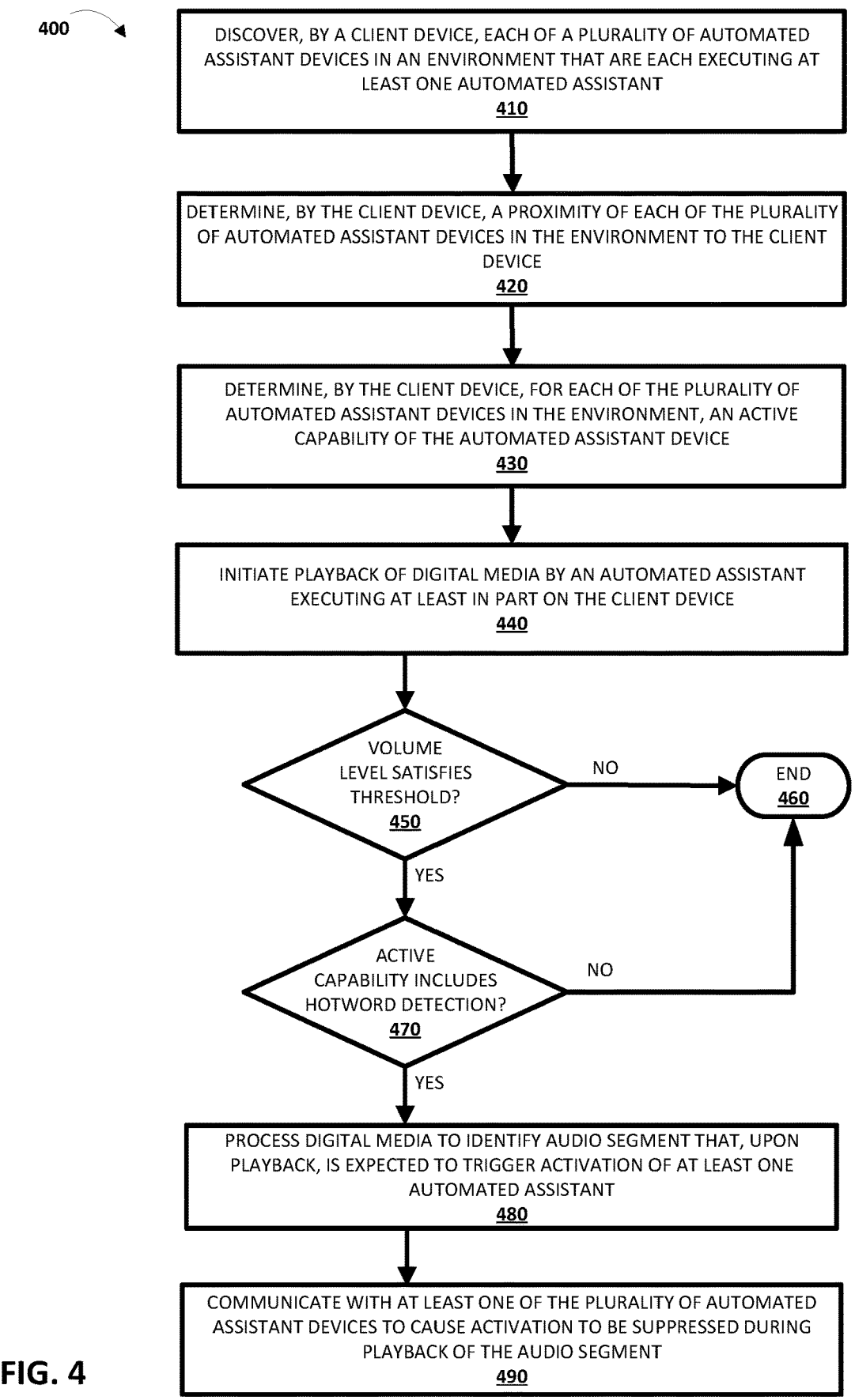
FIG. 4 depicts a flowchart illustrating an example method of detecting and suppressing commands in media that may trigger another automated assistant, in accordance with various implementations.

FIG. 4 depicts a flowchart illustrating an example method 400 of detecting and suppressing commands in media that may trigger another automated assistant. For convenience, the operations of the method 400 are described with reference to a system that performs the operations. This system of method 400 includes one or more processors and/or other component(s) of a client device. Moreover, while operations of the method 400 are shown in a particular order, this is not meant to be limiting. One or more operations may be reordered, omitted, or added.

At block 410, the system discovers, by a client device, each of a plurality of automated assistant devices in an environment that are each executing at least one automated assistant, using a wireless communication protocol. In some implementations, an automated assistant running on the client device may discover each of the plurality of automated assistant devices in the environment (e.g., a user's home) using an API based on a wireless communication protocol (e.g., WiFi or Bluetooth). Block 410 may be repeated on an ongoing basis (e.g., at a predetermined time interval), such that additions or deletions to the automated assistant devices in the environment are discovered by the client device.

At block 420, the system determines, by the client device, a proximity of each of the plurality of automated assistant devices in the environment (discovered at block 410) to the client device using calibration sounds or wireless signal strength analysis. Block 420 may be repeated on an ongoing basis (e.g., at a predetermined time interval), such that changes in proximity (e.g., due to repositioning of automated assistant devices in the environment) are identified.

At block 430, the system determines, by the client device, for each of the plurality of automated assistant devices in the environment (discovered at block 410), an active capability of the automated assistant device. In some implementations, the determining the active capability of the automated assistant device includes one or more of determining whether or not the automated assistant device is performing hotword detection (or key phrase detection), determining whether or not the automated assistant device is performing open-ended automatic speech recognition, and determining whether or not the automated assistant device is listening for specific voices.

Still referring to block 430, in some implementations, the client device may determine the active capability using an API which declares a current state of the automated assistant devices. In other implementations, the client device may determine the active capability via static knowledge of capabilities of particular automated assistant devices (e.g., automated assistant device type 1 may always listen for "Hey Device 1"). In other implementations, the client device may rely on ambient awareness to determine the active capability. For example, the client device may process and detect interactions with other automated assistants that are nearby and track the state of the other automated assistant devices. Block 430 may be repeated on an ongoing basis (e.g., at a predetermined time interval), such that changes in active capability (e.g., due to changes in state of the automated assistant devices) are identified. For some devices, certain active capabilities may remain unchanged over time, e.g., if a hotword model is always active on a particular automated assistant device.

In some implementations, by discovering the plurality of automated assistant devices in the environment at block 410, discovering the proximity of each of the plurality of automated assistant devices in the environment at block 420, and determining the active capability for each of the plurality of automated assistant devices in the environment at block 430, the client device maintains information regarding a set of nearby automated assistant devices and a set of respective capabilities that are known to be active on those nearby automated assistant devices. There may be some overlap between the capabilities. For example, multiple automated assistant devices may be listening for a particular hotword, or listening for a particular key phrase (e.g., "play music").

At block 440, the system initiates playback of digital media by an automated assistant executing at least in part on the client device. In some implementations, playback may be initiated via a spoken utterance of the user that includes a request to initiate playback (e.g., "Hey Computer, play the latest episode of my favorite podcast"). In other implementations, playback may be initiated by a user casting content to a particular target device.

At block 450, the system determines whether or not a volume level associated with playback of the digital media (initiated at block 440) satisfies a threshold determined based on the proximity of each of the plurality of automated assistant devices to the client device (determined at block 420). The threshold may be a volume level that is sufficiently high, given the proximity (determined at block 420) of the automated assistant devices in the environment, such that the automated assistant devices would be triggered by any hotwords or commands present in the audio track of the digital media for which playback was initiated at block 440. If, at an iteration of block 450, the system determines that the volume level associated with playback of the digital media does not satisfy the threshold, then the system proceeds to block 460, and the flow ends. On the other hand, if, at an iteration of block 450, the system determines that the volume level associated with playback of the digital media satisfies the threshold, then the system proceeds to block 470.

At block 470, the system determines whether or not that the active capability (determined at block 430) of one or more of the plurality of automated assistant devices includes performing hotword detection or performing open-ended automatic speech recognition. If, at an iteration of block 470, the system determines that it is not the case that the active capability of one or more of the plurality of automated assistant devices includes performing hotword detection or performing open-ended automatic speech recognition, then the system proceeds to block 460, and the flow ends. On the other hand, if, at an iteration of block 470, the system determines that the active capability of one or more of the plurality of automated assistant devices includes performing hotword detection or performing open-ended automatic speech recognition, then the system proceeds to block 480.

At block 480, in response to the system initiating playback of the digital media (at block 440), determining that the volume level satisfies the threshold (at block 450), and determining that the active capability of one or more of the plurality of automated assistant devices includes performing hotword detection or performing open-ended automatic speech recognition (at block 470), the client device processes the digital media to identify an audio segment in the digital media that, upon playback, is expected to trigger activation of at least one automated assistant executing on at least one of the plurality of automated assistant devices in the environment, based on the active capability of the at least one of the plurality of automated assistant devices (determined at block 430). In some implementations, the client device may continuously analyze the digital media stream (e.g., using a lookahead buffer) to determine potential audio segments in the digital media which are expected to trigger automated assistant functions in other nearby devices. In some implementations, multiple audio segments may be identified at block 480 as audio segments that are expected to trigger activation of at least one automated assistant executing on at least one of the plurality of automated assistant devices in the environment.

Still referring to block 480, in some implementations, the client device processes the digital media using one or more hotword detection models to detect potential triggers in the digital media. For example, a first hotword detection model may be associated with both the client device and a first automated assistant device discovered at block 410 that listens for a first set of hotwords, and a second hotword detection model may be a proxy model that is associated with a second automated assistant device discovered at block 410 that listens for a second set of hotwords, the second automated assistant device having capabilities that are different from those of the client device. In some implementations, the hotword detection model(s) may include one or more machine learning models that generate a predicted output that indicates a probability of one or more hotwords being present in an audio segment in the digital media. The one or more machine learning models can be, for example, on-device hotword detection models and/or other machine learning models. Each of the machine learning models may be a deep neural network or any other type of model and may be trained to recognize one or more hotwords. Further, the generated output can be, for example, a probability and/or other likelihood measures.

Still referring to block 480, in some implementations, in response to the predicted output from one or more hotword detection models satisfying a threshold that is indicative of the one or more hotwords being present in the audio segment in the digital media, the client device may identify the audio segment as an audio segment in the digital media that, upon playback, is expected to trigger activation of at least one automated assistant (i.e., the automated assistant(s) associated with the one or more hotword detection models that generated the predicted output satisfying the threshold). In an example, assume the predicted output is a probability and the probability must be greater than 0.85 to satisfy the threshold that is indicative of the one or more hotwords being present in the audio segment in the digital media, and the predicted probability is 0.88. Based on the predicted probability of 0.88 satisfying the threshold of 0.85, the system identifies the audio segment in the digital media as an audio segment in the digital media that, upon playback, is expected to trigger activation of at least one automated assistant. In some implementations, the hotword detection model(s) may generate a predicted output that satisfies the threshold in the case of words or phrases that are acoustically similar to a hotword. In this case, an audio segment in the digital media that includes the acoustically similar words or phrases may be identified as an audio segment in the digital media that, upon playback, is expected to trigger activation of at least one automated assistant executing on at least one of the plurality of automated assistant devices in the environment.

At block 490, in response to identifying the audio segment(s) in the digital media (at block 480), the client device communicates with at least one of the plurality of automated assistant devices in the environment to cause the activation of the at least one automated assistant executing on the at least one of the plurality of automated assistant devices in the environment to be suppressed during playback of the audio segment. In some implementations, the client device, in response to detecting a potential trigger for at least one of the plurality of automated assistant devices in the environment, performs proactive suppression to prevent other devices from incorrectly handling the audio segment(s) as automated assistant input.

Still referring to block 490, in some implementations, the communicating with at least one of the plurality of automated assistant devices in the environment to cause the activation of the at least one automated assistant executing on the at least one of the plurality of automated assistant devices in the environment to be suppressed during playback of the audio segment includes providing at least a portion of the audio segment or a fingerprint based on the audio segment to at least one of the plurality of automated assistant devices, or providing an instruction to at least one of the plurality of automated assistant devices to stop listening at a time corresponding to the audio segment.

In some implementations, if a fingerprint is provided and the automated assistants running on the automated assistant devices are triggered, they can compare the fingerprint to a fingerprint over the audio that was captured, and if there is a match, then the trigger is suppressed. If an audio segment is provided, it can be used as a reference for an acoustic echo cancellation algorithm to cause the activation of the at least one automated assistant executing on the at least one of the plurality of automated assistant devices in the environment to be suppressed during playback of the audio segment. In this case, real user speech may still be allowed to pass through.

In some implementations, the system may provide a feedback mechanism to the user (e.g., via the client device) through which the user may be able to identify unintended activations of automated assistants. For example, the automated assistant running on the client device may ask the user, "Was this a mis-trigger?" when an automated assistant running on one of the automated assistant devices triggers during playback of the digital media on the client device.

Figure 5:
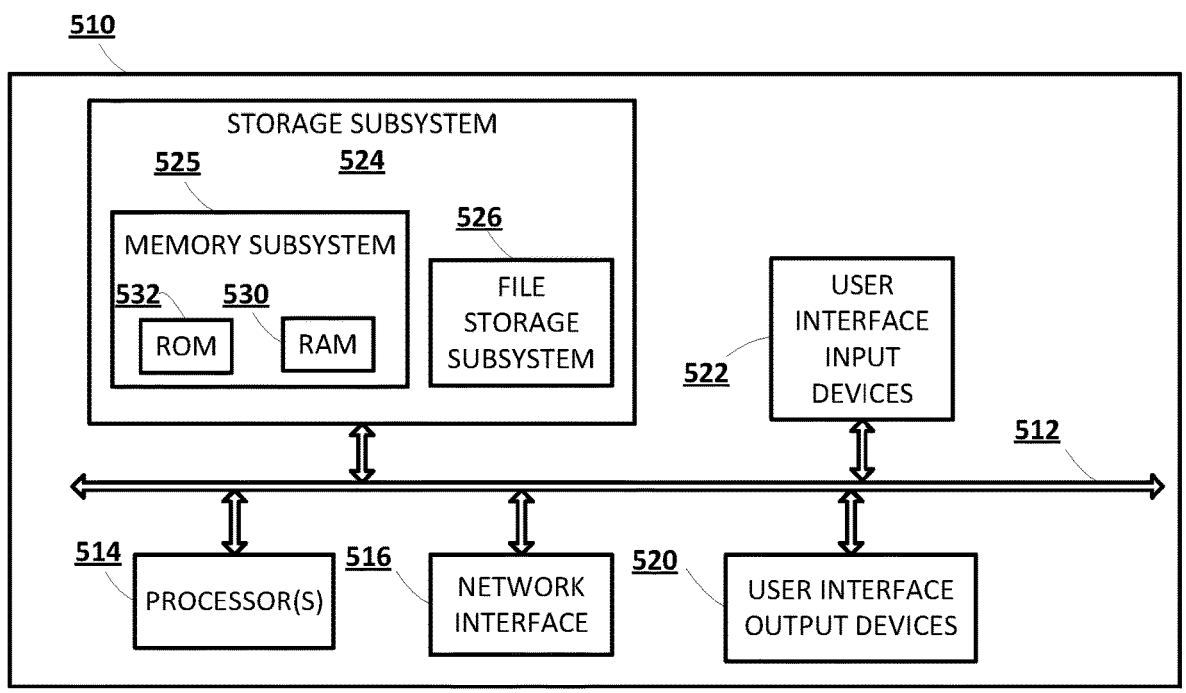
FIG. 5 depicts an example architecture of a computing device.

FIG. 5 is a block diagram of an example computing device 510 that may optionally be utilized to perform one or more aspects of techniques described herein. In some implementations, one or more of a client device, cloud-based automated assistant component(s), and/or other component(s) may comprise one or more components of the example computing device 510.

Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the methods disclosed herein, as well as to implement various components depicted in FIGS. 1A and 1B.

These software modules are generally executed by processor 514 alone or in combination with other processors. The memory subsystem 525 included in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:

for each of a plurality of automated assistant devices in an environment that are each executing at least one automated assistant, determining, by a client device, an active capability of the automated assistant device, wherein the determining the active capability of the automated assistant device comprises determining whether or not the automated assistant device is currently performing open-ended automatic speech recognition, and wherein currently performing the open-ended automatic speech recognition comprises the automated assistant device being in a state in which speech is currently being recognized using a speech recognition model rather than only detecting one or more hotwords using a hotword detection model;

initiating, by an automated assistant executing at least in part on the client device, playback of digital media;

in response to initiating playback, the client device processing the digital media to identify, based on the active capability of at least one of the plurality of automated assistant devices in the environment comprising currently performing the open-ended automatic speech recognition, an audio segment in the digital media, wherein the audio segment is identified based on the audio segment being expected, upon playback, to trigger activation of at least one automated assistant executing on the at least one of the plurality of automated assistant devices, based on the at least one of the plurality of automated assistant devices being in the state in which speech is currently being recognized using the speech recognition model rather than only detecting the one or more hotwords using the hotword detection model; and in response to identifying the audio segment in the digital media, the client device modifying the digital media to suppress the activation of the at least one automated assistant executing on the at least one of the plurality of automated assistant devices in the environment.

2. The method according to claim 1, further comprising discovering, by the client device, each of the plurality of automated assistant devices in the environment using a wireless communication protocol.

3. The method according to claim 1, further comprising determining, by the client device, a proximity of each of the plurality of automated assistant devices to the client device using calibration sounds or wireless signal strength analysis.

4. The method according to claim 3, wherein the client device processing the digital media to identify the audio segment is further in response to determining that a volume level associated with playback of the digital media satisfies a threshold determined based on the proximity of each of the plurality of automated assistant devices to the client device.

5. The method according to claim 1, wherein the determining the active capability of the automated assistant device further comprises determining whether or not the automated assistant device is currently listening for specific voices.

6. The method according to claim 5, wherein the client device processing the digital media to identify the audio segment is further based on an output of a speaker identification model and in response to determining that the active capability of one or more of the plurality of automated assistant devices includes performing open-ended automatic speech recognition.

7. The method according to claim 1, wherein the client device modifying the digital media comprises inserting a digital watermark into an audio track of the digital media.

8. A computer program product comprising one or more non-transitory computer-readable storage media having program instructions collectively stored on the one or more computer-readable storage media, the program instructions, when executed by a processor, to:

for each of a plurality of automated assistant devices in an environment that are each executing at least one automated assistant, determine, by a client device, an active capability of the automated assistant device, wherein the determining the active capability of the automated assistant device comprises determining whether or not the automated assistant device is currently performing open-ended automatic speech recognition, and wherein currently performing the open-ended automatic speech recognition comprises the automated assistant device being in a state in which speech is currently being recognized using a speech recognition model rather than only detecting one or more hotwords using a hotword detection model;

initiate, by an automated assistant executing at least in part on the client device, playback of digital media;

in response to initiating playback, process the digital media, by the client device, to identify, based on the active capability of at least one of the plurality of automated assistant devices in the environment comprising currently performing the open-ended automatic speech recognition, an audio segment in the digital media, wherein the audio segment is identified based on the audio segment being expected, upon playback, to trigger activation of at least one automated assistant executing on the at least one of the plurality of automated assistant devices, based on the at least one of the plurality of automated assistant devices being in the state in which speech is currently being recognized using the speech recognition model rather than only detecting the one or more hotwords using the hotword detection model; and in response to identifying the audio segment in the digital media, modify the digital media, by the client device, to suppress the activation of the at least one automated assistant executing on the at least one of the plurality of automated assistant devices in the environment.

9. The computer program product according to claim 8, wherein the program instructions are further executable to discover, by the client device, each of the plurality of automated assistant devices in the environment using a wireless communication protocol.

10. The computer program product according to claim 8, wherein the program instructions are further executable to determine, by the client device, a proximity of each of the plurality of automated assistant devices to the client device using calibration sounds or wireless signal strength analysis.

11. The computer program product according to claim 10, wherein the client device processing the digital media to identify the audio segment is further in response to determining that a volume level associated with playback of the digital media satisfies a threshold determined based on the proximity of each of the plurality of automated assistant devices to the client device.

12. The computer program product according to claim 8, wherein the determining the active capability of the automated assistant device further comprises determining whether or not the automated assistant device is currently listening for specific voices.

13. The computer program product according to claim 12, wherein the client device processing the digital media to identify the audio segment is further based on an output of a speaker identification model and in response to determining that the active capability of one or more of the plurality of automated assistant devices includes performing open-ended automatic speech recognition.

14. The computer program product according to claim 8, wherein the client device modifying the digital media comprises inserting a digital watermark into an audio track of the digital media.

15. A system comprising:

a processor, a computer-readable memory, one or more computer-readable storage media, and program instructions collectively stored on the one or more computer-readable storage media, the program instructions executable to:

for each of a plurality of automated assistant devices in an environment that are each executing at least one automated assistant, determine, by a client device, an active capability of the automated assistant device, wherein the determining the active capability of the automated assistant device comprises determining whether or not the automated assistant device is currently performing open-ended automatic speech recognition, and wherein currently performing the open-ended automatic speech recognition comprises the automated assistant device being in a state in which speech is currently being recognized using a speech recognition model rather than only detecting one or more hotwords using a hotword detection model;

initiate, by an automated assistant executing at least in part on the client device, playback of digital media;

in response to initiating playback, process the digital media, by the client device, to identify, based on the active capability of at least one of the plurality of automated assistant devices in the environment comprising currently performing the open-ended automatic speech recognition, an audio segment in the digital media, wherein the audio segment is identified based on the audio segment being expected, upon playback, to trigger activation of at least one automated assistant executing on the at least one of the plurality of automated assistant devices, based on the at least one of the plurality of automated assistant devices being in the state in which speech is currently being recognized using the speech recognition model rather than only detecting the one or more hotwords using the hotword detection model; and in response to identifying the audio segment in the digital media, modify the digital media, by the client device, to suppress the activation of the at least one automated assistant executing on the at least one of the plurality of automated assistant devices in the environment.

16. The system according to claim 15, wherein the program instructions are further executable to discover, by the client device, each of the plurality of automated assistant devices in the environment using a wireless communication protocol.

17. The system according to claim 15, wherein the program instructions are further executable to determine, by the client device, a proximity of each of the plurality of automated assistant devices to the client device using calibration sounds or wireless signal strength analysis.

18. The system according to claim 17, wherein the client device processing the digital media to identify the audio segment is further in response to determining that a volume level associated with playback of the digital media satisfies a threshold determined based on the proximity of each of the plurality of automated assistant devices to the client device.

19. The system according to claim 15, wherein the determining the active capability of the automated assistant device further comprises determining whether or not the automated assistant device is currently listening for specific voices.

20. The system according to claim 19, wherein the client device processing the digital media to identify the audio segment is further based on an output of a speaker identification model and in response to determining that the active capability of one or more of the plurality of automated assistant devices includes performing open-ended automatic speech recognition.

* * * * *